United States Patent Office

3,305,367
Patented Feb. 21, 1967

3,305,367
METHOD OF DESTROYING *TRICHINELLA SPIRALIS* IN MEAT INFESTED THEREWITH
Mauritz Gunnar Anderson, Wheaton, and Edward Eagle, Evanston, Ill., assignors to Swift & Company, Chicago, Ill., a corporation of Illinois
No Drawing. Filed Dec. 5, 1963, Ser. No. 328,186
9 Claims. (Cl. 99—157)

This invention relates to the treatment of macroscopic organisms in meat and meat products and more particularly provides a method for the destruction of nematodes such as *Trichinella spiralis* in meat and meat products.

The problem of controlling certain nematodes such as *Trichinella spiralis* in animal muscle is of long standing. The presence or suspected presence of trichinae in meat has resulted in expensive processing, and in some instances the wasteful destruction of such meat because of the lack of any effective or economically practical method of destroying such organisms.

The macroscopic parasite, *Trichinella spiralis*, in swine has historically required prolonged and costly processing of pork products to protect the consumer against trichinosis. Historically, two approaches have been employed for the protection of pork consumers. The first of these is the control of infection from animal to animal such as the cooking of garbage to be used in the feeding of hogs. The second approach to the problem is killing the nematode organisms by specific temperature changes such as heating the meat up to greater than 132° F. or freezing the meat at temperatures below 0° F. for varying lengths of time depending upon the thickness of the meat.

Radiation and certain chemicals have been employed with varying degrees of success in the destruction of microscopic organisms such as bacteria, spores, fungus, yeast, molds, etc. However, these techniques have not offered a commercially practical method of controlling macroscopic organisms and have raised various difficulties such as odor and flavor.

Therefore, it is an object of this invention to provide a method for the eradication of macroscopic nematodes in meat and meat products.

It is another object of this invention to provide a method for treating meat and meat products infested or suspected of being infested with *Trichinella spiralis*.

It is also an object of this invention to provide a method for treating meat and meat products known or suspected to be infested with macroscopic parasites with ethylene oxide and/or propylene oxide.

It is an additional object of this invention to provide a commercially practical method of destroying macroscopic parasites in meat and meat products which does not effect death of microscopic organisms such as bacteria, spores, fungi, yeasts, molds, etc.

It is a further object of this invention to provide a commercially practical method of destroying *Trichinella spiralis* in meat which is not subjected to temperatures above 132° F.

These and still other objects of the invention will become readily apparent to one skilled in the art from the following detailed description of the invention.

Generally, the present invention relates to the eradication of macroscopic organisms in meat and meat products by exposure to ethylene oxide and/or propylene oxide. More specifically we have discovered that macroscopic organisms such as *Trichinella spiralis* may be destroyed in meat and meat products under operating conditions milder than those required to sterilize or destroy microscopic organisms such as bacteria, spores, fungi, yeasts, molds, etc. The discovery of the distinction between sterilizing conditions applicable for macroscopic and microscopic organisms in meat has the advantage of overcoming the inherent problems associated with sterilization at the microscopic level. In addition, this discovery is particularly advantageous in killing viable *Trichinella spiralis* in processed meats not subjected to temperatures above 132° F.

Trichinae are invertebrates found in the phylum Nemathelminthes or are worms visible to the naked eye. As such, trichinae are not considered microscopic organisms as are bacteria, spores, fungi, yeasts, molds, and the like. We have found that trichinae infested pork, venison, bear meat, poultry, rabbit, etc., can be rendered trichinae-free by exposure to an atmosphere or solution containing small amounts of propylene oxide and/or ethylene oxide. These gases may be blended with carrier gases such as nitrogen, carbon dioxide, air, etc. References here to meat are understood to include all varieties of meats and food products containing meat which may be infested with nematodes such as *Trichinella spiralis*.

The following examples illustrate some of the many ways in which meat and meat products can be treated with ethylene oxide and propylene oxide for the purpose of killing viable trichinae present therein.

In preparing for these experiments, 2–3 week old pigs were fed sizable dosages of ground trichinous rat meat together with their usual feed. This produced animals which contained large numbers of larvae in their muscle meat. The trichinae contained in this meat were then allowed to become encysted before being treated in various ways using ethylene oxide and/or propylene oxide.

*Example I*

The work of this example and the next were undertaken to demonstrate the unobvious differences in operating conditions required for sterilizing meats for macroscopic organisms and those required for microscopic organisms. 30-gram samples of emulsions of fresh lean and fat pork were contacted at 32° F. for three hours with sufficient 3% propylene oxide aqueous solution to cover the meat. Contact was effected by a stirrer. Analysis of the fat and lean emulsions showed a 100% trichinae kill. However, approximately the same number of bacterial colonies were present in the treated emulsions as were present in the control samples.

*Example II*

Samples similar to those prepared in Example I were contacted with ethylene oxide at a partial pressure of 200 mm. of Hg for one hour at 32° F. Contact was effected by a stirrer. Analysis showed 100% trichinae kill. However, approximately one-half the same number of bacterial colonies were present in the treated emulsion as were present in the control samples.

*Example III*

This series of tests were undertaken to demonstrate the minimum time required to effect a 100% trichinae kill in ground meat emulsions heavily infested with trichinae when contacted with an aqueous solution of propylene oxide of varying concentrations.

PROPYLENE OXIDE IN GROUND MEAT

| Concentration | Temperature | Time |
|---|---|---|
| 0.01 | Above about 24° F | 4 Hours. |
| 0.1 | do | 2 Hours. |
| 0.5 | do | 1½ Hours. |
| 1.0 | do | ½ Hour. |
| 3.0 | do | 10 Minutes. |

*Example IV*

This series of tests were undertaken to demonstrate the minimum time required to effect a 100% trichinae kill in meat strips such as bacon and particles measuring ¼ inch in thickness such as meat cubes when contacted with an aqueous solution of propylene oxide of varying concentrations.

PROPYLENE OXIDE IN MEAT OF ¼ INCH THICKNESS

| Concentration | Temperature | Time |
| --- | --- | --- |
| 0.01 | Above about 24° F | 6 Hours. |
| 0.1 | -----do----- | 3 Hours. |
| 0.5 | -----do----- | 2 Hours. |
| 1.0 | -----do----- | 1 Hour. |
| 3.0 | -----do----- | ½ Hour. |

*Example V*

This series of tests were undertaken to demonstrate the minimum time required to effect a 100% trichinae kill in meat strips such as bacon and particles measuring ½ inch in thickness such as meat cubes when contacted with an aqueous solution of propylene oxide of varying concentrations.

PROPYLENE OXIDE IN MEAT OF ½ INCH THICKNESS

| Concentration | Temperature | Time |
| --- | --- | --- |
| 0.01 | Above about 24° F | 10 Hours. |
| 0.1 | -----do----- | 4 Hours. |
| 0.5 | -----do----- | 3 Hours. |
| 1.0 | -----do----- | 2½ Hours. |
| 3.0 | -----do----- | 1½ Hours |

*Example VI*

This series of tests were undertaken to demonstrate the minimum time required to effect a 100% trichinae kill in ground meat emulsions, and meat strips and/or particles measuring up to ½ inch in thickness when contacted with an atmosphere of ethylene oxide under partial pressures of varying concentrations.

ETHYLENE OXIDE IN GROUND MEAT

| Concentration of Ethylene Oxide | Temperature | Time |
| --- | --- | --- |
| 100 mm. Hg | Above about 24° F | ½ Hour. |
| 200 mm. Hg | -----do----- | ¼ Hour. |

MEAT PARTICLES ½ INCH IN THICKNESS

| Concentration of Ethylene Oxide | Temperature | Time |
| --- | --- | --- |
| 100 mm. Hg | Above about 24° F | 1 Hour. |
| 200 mm. Hg | -----do----- | ½ Hour. |

The following examples merely illustrate some of the various applications of the instant method undertaken and are not intended to conflict with the aforementioned examples showing the various minimum times and concentration levels.

*Example VII*

30-gram samples of emulsions of fresh lean and fat pork were placed in different containers and put in a vessel which was evacuated to a partial pressure of 150 mm. of mercury at 75° F. Ethylene oxide was introduced to increase the partial pressure to 250 mm. of Hg and held for fifteen minutes after which time the pressure was equalized by admitting air and the samples were removed. Analysis showed a 100% trichinae kill.

*Example VIII*

Pork chops up to but not exceeding ½ inch in thickness were dipped into a 0.5% propylene oxide solution at 40° F. for three hours. Analysis showed a 100% trichinae kill.

*Example IX*

Bacon slices were dipped at 34° F. for one hour into sufficient 1% aqueous solution of propylene oxide to cover the meat. Analysis showed a 100% trichinae kill.

*Example X*

Bacon slices were placed into a vessel and evacuated to a partial pressure of 150 mm. of Hg at 75° F. and ethylene oxide was then backfilled into the vessel to increase the partial pressure to 350 mm. of Hg for one hour, after which time the pressure was equalized by admitting the air in the sample removed. Analysis showed a 100% trichinae kill.

*Example XI*

Samples of ¼ inch cubed meat were prepared in a manner similar to Example I and were placed in a vessel, to an absolute pressure of 150 mm. of Hg at 75° F., ethylene oxide was introduced to increase the pressure to 350 mm. Hg and held for ten minutes. The pressure was then equalized by admitting air and the sample was removed. Analysis showed a 100% trichinae kill.

*Example XII*

Slices of fresh ham not exceeding ½ inch in thickness were dipped in a 0.01% aqueous propylene oxide solution of 32° F. for ten hours. Analysis showed a 100% trichinae kill.

*Example XIII*

Slices of fresh ham not exceeding ½ inch in thickness were placed in a vessel and evacuated to an absolute pressure of 150 mm. of Hg at 75° F. Then ethylene oxide was introduced to increase the partial pressure to 350 mm. Hg for thirty minutes after which the pressure was equalized by admitting air and the sample was removed. Analysis showed a 100% trichinae kill.

*Example XIV*

Samples of ½ inch cubes of meat were prepared in a manner similar to Example I and placed in a vessel, contacted with propylene oxide at room temperature for 5 minutes and removed. Analysis showed a 100% trichinae kill.

*Example XV*

A ten-pound ham was pumped with aqueous pickle which contained a 0.5% dilution of propylene oxide at 34° F. It was held at this temperature for 4 hours and then prepared for examination. Analysis showed a substantial reduction in the number of viable parasites; however, a sufficient number of trichinae survived in this and other experiments to indicate a limitation of a maximum thickness of ½ inch slices since penetration within practical time and concentration limits seems to be about ¼ inch in each side of lean meat or fat tissue.

Other experiments undertaken clearly indicated it was inconsequential whether the lethal gas or chemical was dissolved in water or ice, or diluted or extended in any other liquid, solid or gaseous diluent.

Both temperature and pressure per se have been found to have negligible effect upon the lethal concentration used either as a vapor or aqueous solutions. However, there are certain limitations; such as, solid frozen meats do not lend themselves to the penetration of either chemical vapors or solutions. Unreasonably high temperatures may raise such secondary reactions as excess loss of chemicals through vaporization, incrasing the spoilage rate at incubation temperatures, possibility of partial coagulation of the proteins, and reaction of these chemicals with a moisture to form undesirable chemicals such as glycol. We have found that out process should be confined within the temperature ranges from about 24° F. to about 90° F. with the preferred temperature range for handling most meats being from about 26° F. to about 50° F.

From the above, it will be obvious that the conditions may readily be chosen and the treatment changed to effect macroscopic sterilization without the necessity of producing microscopic sterilization. Obviously, many modifications and variations of the invention as hereinbefore set forth may be made without departing from the spirit and scope thereof, and therefore only such limitations should be imposed as are indicated in the appended claims.

We claim:

1. A method of destroying *Trichinella spiralis* infesting meat and meat products comprising: contacting said meat above about 24° F. and up to about one-half inch thickness with an atmosphere containing ethylene oxide for a time sufficient to kill all viable *Trichinella spiralis* organisms and removing the meat prior to sterilization of a natural microscopic flora thereof.

2. The method of claim 1 wherein the meat is comminuted and is subjected to a substantial vacuum with a partial pressure of ethylene oxide.

3. The method of claim 1 wherein the meat is contacted with a partial pressure of ethylene oxide of at least about 100 mm. of mercury.

4. The method of claim 1 wherein the meat is slices and cubes up to about one-half inch in thickness.

5. The method of claim 1 wherein the meat is an emulsion.

6. A method of destroying *Trichinella spiralis* infesting meat and meat products comprising: contacting said meat above about 24° F. and up to about one-half inch in thickness with an aqueous solution of propylene oxide, holding the meat in the solution for a time sufficient to kill all viable *Trichinella spiralis* and removing the meat prior to the sterilization of the natural microscopic flora thereof.

7. The method of claim 6 wherein the aqueous solution is from about 0.01% propylene oxide.

8. The method of claim 6 wherein the meat is slices and cubes up to about one-half inch in thickness.

9. The method of claim 6 wherein the temperature of the meat is from about 24° F. to about 90° F., the aqueous solution is 3% propylene oxide at about room temperature and the holding period is at least five minutes.

References Cited by the Examiner

UNITED STATES PATENTS

| | | | |
|---|---|---|---|
| 2,075,845 | 4/1937 | Gross et al. | 99—225 |
| 2,107,697 | 2/1938 | Griffith et al. | 99—225 |
| 2,370,768 | 3/1945 | Baerwald. | |
| 2,380,416 | 7/1945 | Davidson. | |
| 2,473,984 | 6/1949 | Bickerton | 167—39 X |

A. LOUIS MONACELL, *Primary Examiner.*

HYMAN LORD, *Examiner.*